US008907784B2

(12) United States Patent
Cecchet

(10) Patent No.: US 8,907,784 B2
(45) Date of Patent: Dec. 9, 2014

(54) METHOD AND SYSTEM FOR MANAGING GEOGRAPHICALLY DISTRIBUTED RESOURCES

(75) Inventor: Marco Cecchet, Milan (IT)

(73) Assignee: FM S.R.L., Genoa (IT)

( * ) Notice: Subject to any disclaimer, the term of this patent is extended or adjusted under 35 U.S.C. 154(b) by 58 days.

(21) Appl. No.: 13/148,824

(22) PCT Filed: Feb. 12, 2010

(86) PCT No.: PCT/IB2010/000266
§ 371 (c)(1),
(2), (4) Date: Aug. 10, 2011

(87) PCT Pub. No.: WO2010/092461
PCT Pub. Date: Aug. 19, 2010

(65) Prior Publication Data

US 2011/0309930 A1 Dec. 22, 2011

(30) Foreign Application Priority Data

Feb. 16, 2009 (IT) .............................. BG2009A0003

(51) Int. Cl.

| | |
|---|---|
| ***G08B 1/08*** | (2006.01) |
| ***H04L 29/08*** | (2006.01) |
| ***H04W 4/02*** | (2009.01) |
| ***A43B 3/00*** | (2006.01) |

(52) U.S. Cl.
CPC ............... *H04L 67/125* (2013.01); *H04W 4/02* (2013.01); *A43B 3/0005* (2013.01); *H04W 4/028* (2013.01); *H04L 67/18* (2013.01)
USPC ................. 340/539.13; 340/573.1; 340/572.1

(58) Field of Classification Search
CPC ........ A43B 3/0005; H04L 67/18; H04W 4/02
USPC .............................. 340/539.13, 573.1, 572.1
See application file for complete search history.

(56) References Cited

U.S. PATENT DOCUMENTS

| | | | | |
|---|---|---|---|---|
| 5,959,533 | A * | 9/1999 | Layson et al. | 340/573.1 |
| 6,788,200 | B1 * | 9/2004 | Jamel et al. | 340/539.13 |

(Continued)

FOREIGN PATENT DOCUMENTS

| | | |
|---|---|---|
| EP | 1707065 | 10/2006 |
| WO | 9840022 | 9/1998 |
| WO | 2007001809 | 1/2007 |

OTHER PUBLICATIONS

Foad Dabiri et al: "Electronic Orthotics Shoe: Preventing Ulceration in Diabetic Patients" Engineering in Medicine and Biology Society, 2008. EMBS 2008. 30th Annual International Conference of the IEEE, IEE Piscataway NJ, USA, Aug. 20, 2008, pp. 771-774.

*Primary Examiner* — Eric M Blount
(74) *Attorney, Agent, or Firm* — King & Schickli, PLLC

(57) ABSTRACT

A system for managing geographically distributed resources, comprising a plurality of shoes associated with said resources; each pair of said plurality of shoes comprising an electronic circuit; said electronic circuit comprising a control circuit for said electronic circuit; a locator module which provides the geographical coordinates to said control circuit; a radio communication system; said control system providing a plurality of information items to said communication system; said communication system comprising a first receiver-transmitter for sending said plurality of information items to a local concentrator; said local concentrator comprising a second receiver-transmitter for sending said plurality of information items to an operations center; said first receiver-transmitter sending said plurality of information items to a local concentrator periodically; said control circuit comprising an input connected to at least one sensor; said operations center displaying the location of each of said resources and the information items received from said at least one sensor.

13 Claims, 3 Drawing Sheets

(56) References Cited

U.S. PATENT DOCUMENTS

| | | | | |
|---|---|---|---|---|
| 6,944,542 | B1 * | 9/2005 | Eschenbach | 701/472 |
| 7,123,141 | B2 * | 10/2006 | Contestabile | 340/539.13 |
| 7,486,185 | B2 | 2/2009 | Culpepper et al. | |
| 7,733,224 | B2 * | 6/2010 | Tran | 340/540 |
| 8,077,030 | B2 * | 12/2011 | Kaminski et al. | 340/539.13 |
| 8,200,186 | B2 * | 6/2012 | Ashley et al. | 455/404.2 |
| 2003/0163287 | A1 * | 8/2003 | Vock et al. | 702/187 |
| 2006/0283050 | A1 * | 12/2006 | Carnes et al. | 36/132 |
| 2007/0011919 | A1 * | 1/2007 | Case, Jr. | 36/132 |
| 2008/0174422 | A1 * | 7/2008 | Freathy et al. | 340/539.13 |

* cited by examiner

METHOD AND SYSTEM FOR MANAGING GEOGRAPHICALLY DISTRIBUTED RESOURCES

The present invention relates to a method and system for optimizing the management and ensuring the safety of geographically distributed resources, particularly human resources, for example workers, civil protection operators, firemen, etc.

Personnel and equipment intervention management in those places where their presence is required is of vital importance for their success.

To optimize resources, the greatest amount of information must be exchanged between personnel and operating means.

The operations centre provided must also be in possession of all available information.

An object of the present invention is to provide an improved system for managing geographically distributed resources, to ensure personnel safety and effective intervention coordination.

Another object is to provide a system which does not impede the resources in their operations.

According to the present invention, these and other objects are attained by a system for managing geographically distributed resources, comprising a plurality of shoes associated with said resources; each pair of said plurality of shoes comprising an electronic circuit; said electronic circuit comprising a control circuit for said electronic circuit; a locator module which provides the geographical coordinates to said control circuit; a radio communication system; said control system providing a plurality of information items to said communication system; said communication system comprising a first receiver-transmitter for sending said plurality of information items to a local concentrator; said local concentrator comprising a second receiver-transmitter for sending said plurality of information items to an operations centre; said first receiver-transmitter sending said plurality of information items to a local concentrator periodically; said control circuit comprising an input connected to at least one sensor; said operations centre displaying the location of each of said resources and the information items received from said at least one sensor.

These and other objects are also attained by a method for managing geographically distributed resources, comprising the steps of providing said resources with a plurality of shoes, said method comprising the following steps: inserting an electronic circuit in one of each pair of said plurality of shoes; providing said electronic circuit with the geographical coordinates of said at least one shoe by means of a locator module; providing said electronic circuit with the value of the voltage of a battery for powering said electronic circuit; communicating said geographical coordinates and said voltage value to a local concentrator; sending said geographical coordinates and said voltage value to an operations centre.

Further characteristics of the invention are described in the dependent claims.

The electronic components inserted into the shoe enable the geographical point to be determined and to be communicated to an operations centre; operation is completely autonomous because of an internal battery.

It is also possible to interface sensors or measuring instruments for collecting data from the field.

From the mechanical viewpoint, all the components used in the shoe are housed within the footwear and their arrangement is designed to achieve maximum robustness and protection against impacts, so minimizing maintenance work.

The electronic circuit is advantageously housed in a suitable site on the shoe neck, easily accessed without disturbing the operator.

The reasons for integrating the electronic components into the upper inner part of the leg portion rather than into the sole are related to the difficulty of maintaining a circuit "embedded" into the sole, the non-accessibility of the circuit, and the problems related to the pressures and temperatures during shoe assembly which influence the circuit functionality (high pressures, high temperatures).

The shoe incorporates a short range communication device, for example based on the ZigBee standard.

This simultaneously enables optimal battery consumption management to be obtained, together with the ability to construct "ad hoc" communication networks for the different operational conditions.

The communication device incorporated into the shoe communicates, via a short range communication module, with a local concentrator. This latter is also provided with a long range communication module (GPRS, HSDPA, Satellite, etc.) for communicating with the operations centre.

In its simplest version the concentrator can be personal, or wearable, and have the dimensions of a normal mobile phone.

The invention is particularly applicable to the management of geographically distributed resources, for example workers, civil protection operators, firemen, etc.

The management and safety of workers in their place of work, especially if they are distributed over various locations, can obtain advantage from the present invention.

In the operations centre the workers (resources) are displayed on a map of the zone and can be controlled and warned if approaching prohibited or dangerous zones.

The energy function is managed such as to remotely display the state of charge of the individual equipment components, and of the local concentrator, and to modify the transmission frequency of the individual components. This makes it possible to analyze the state of each node and to optimally manage the remaining charge.

Particularly significant is the ability to modify the frequency of remote transmission on the basis of the risk parameters encountered in the operations centre. In this manner the energy consumption of the local concentrator can vary significantly given that the remote transmission is a function which consumes considerable energy; being able to modify the frequency implies a substantial performance improvement.

The transmission frequency required for each system component can be selected by means of an interface in the operations centre. Once the new configuration has been chosen, a signal is fed to the local concentrator (or local concentrators) (which interprets it and modifies its state), this latter then feeding the signal to the various nodes to be configured.

The characteristics and advantages of the present invention will be apparent from the following detailed description of one embodiment thereof, illustrated by way of non-limiting example in the accompanying drawings, in which.

Figure 1:
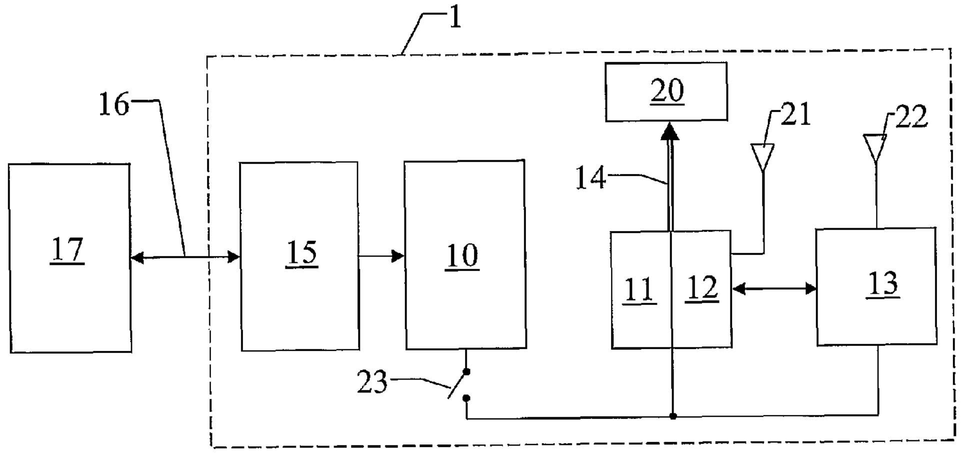
FIG. 1 shows schematically a block scheme of the electronic circuits inserted into the shoe, according to the present invention.
Figure 2:
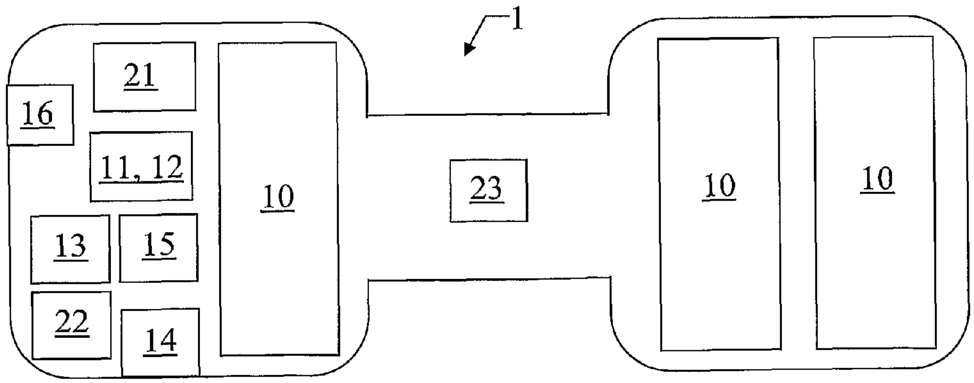
FIG. 2 shows a scheme of the physical arrangement of the is electronic circuits, according to the present invention.
Figure 3:
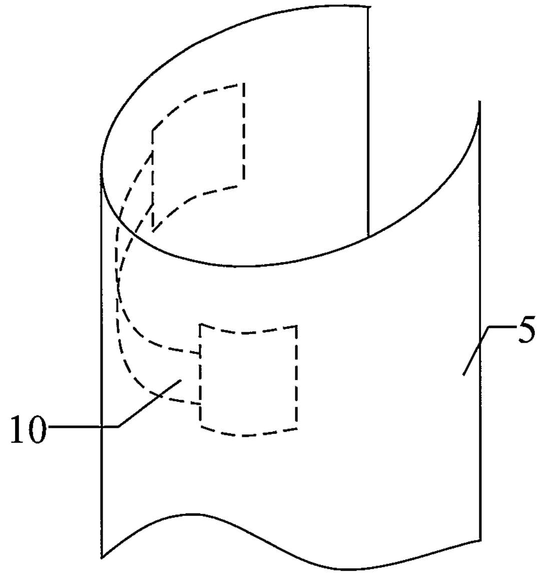
Figure 4:
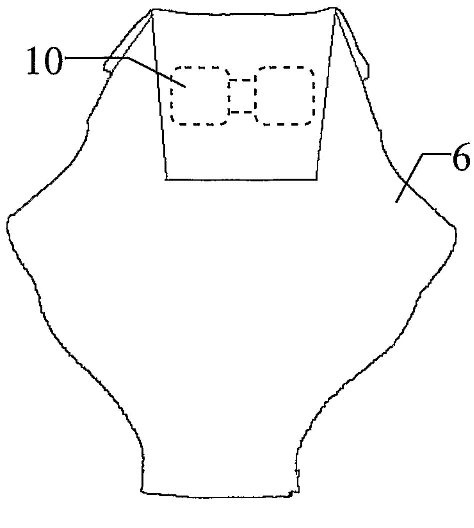
Figure 5:
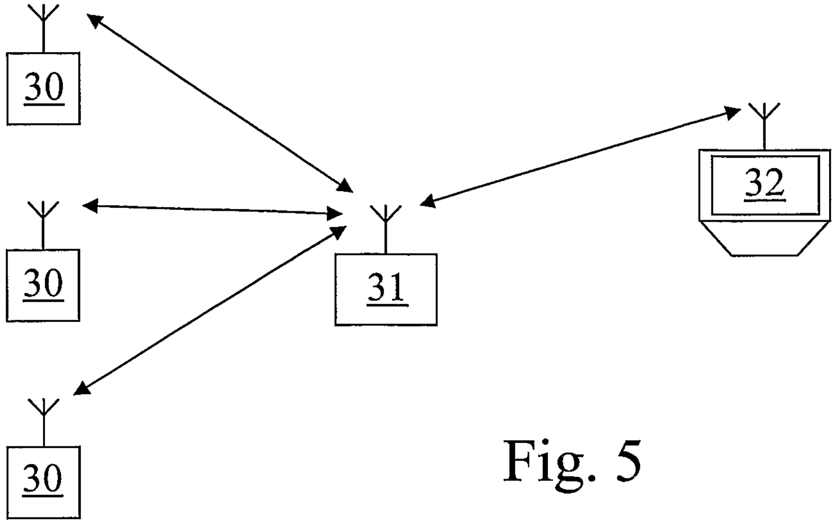

FIG. 3 partially shows schematically the position of the electronic circuits within a shoe, according to a first embodiment of the present invention;

FIG. 4 shows schematically the position of the electronic circuits within a shoe, according to a second embodiment of the present invention;

FIG. 5 shows a block scheme of a system for managing geographically distributed resources according to the present invention.

With reference to the accompanying figures, an electronic circuit 1 used in a system for managing geographically distributed resources according to the present invention, comprises a battery 10 for powering the electronic circuit; a microprocessor 11 operating as a control circuit for the electronic circuit; a communication system 12, preferably via radio with an antenna 21; a locator module 13, for example a satellite-based locator such as the GPS (Global Positioning System), with an antenna 22.

The microprocessor 11 comprises one or more interfaces 14 to enable connection to one or more sensors 20 and/or measuring instruments.

The battery 10 is preferably rechargeable and is provided with a charging and protection circuit 15, connectable preferably via a connector 16 to an external battery charger 17.

The circuit comprises a switch 23 for activating/deactivating the is electronic circuit, preferably in the form of a magnetic switch.

The battery 10 is of the Li-polymer type, in particular 3×240 mAh batteries being used, for a total capacity of 720 mAh and a total weight of 21 grams. Other batteries can be used.

The charging and protection control circuit 15 comprises an LTC1844 linear battery charger provided with load regulation based on temperature and settable current threshold.

To prevent dangerous situations for the user deriving from the Li-Polymer batteries, the circuit 15 comprises a Seiko S8241 integrated circuit. It is able to protect the battery, and hence prevent potential risks of fire or electrolyte escape, and prevent excessive charge/discharge conditions and overload.

The external battery charger 17 must be able to deliver at least 400 mA at 5Vdc, to enable the batteries to be completely recharged, in the worst case, within 3 hours. The battery charger 17 is advantageously connected to the shoe by means of a standard USB A—Mini USB cable. It can also be used to connect to, read the memories of, and programme the microprocessor 11.

The microprocessor 11 and the communication system 12 are advantageously integrated into a single CC2430 integrated circuit. It represents a device pertaining to the "System-on-Chip" (SoC) category, specifically designed for IEEE standard 802.15.4 and ZigBee applications. This enables ZigBee network nodes to be constructed with a very limited number of external components, to the advantage of low cost and reliability.

The 2.4 GHz antenna 21 for the ZigBee network is provided directly on the printed circuit.

The operating range of the individual ZigBee node is up to 300 m in open space and up to 100 m in buildings; these maximum values are however subject to reduction deriving from the actual utilization conditions, such as the presence of obstacles, the type and orientation of the antennas used. A good evaluation is to consider an operating range of about 100 m in open space and about 40 m in buildings.

In using the CC2430 circuit, the available interfaces 14 comprise 8 analog-digital (A/D) converters, 21 digital input-output (I/O) lines, and a bus serial peripheral interface (SPI).

The sensors 20 can be internal or external, connected by connectors to the aforesaid interfaces.

The locator module 13 preferably uses a GPS u-Blox NEO-5Q module of high sensitivity (−160 dBm) and hence suitable for indoor applications or where the GPS antenna is not optimally positioned. It provides the geographical coordinates, and other information, of the shoe incorporating the circuit 1.

The electronic components (of the circuit 1) are housed in the upper inner rear part of the leg portion 5 of a shoe, typically a tall boot. For this purpose a suitable pocket has been formed, closable by Velcro. The electronic components are positioned as a replacement for the padding.

The neck lining is formed not with classical sewing to the rest of the lining which completely closes this latter, but instead it forms a lapel which by means of a male Velcro piece sewn to its lower edge couples to a female Velcro piece sewn onto the lower edge of the lining, a male Velcro piece being sewn to the two lateral edges to couple to a female Velcro piece sewn directly onto the interior of the vamp.

The entire edge of the neck lining insert is sewn directly to the leather insert of the outer neckpiece such that the two sides become surmounted and have their outer parts adjacent and in contact; then when sewn, the two elements can be turned inside out to form the entire neckpiece.

When hemming the neck lining insert, a male Velcro piece is applied and sewn to it along the entire length of its lower edge, together with a male Velcro piece on each of its two sides, sewn laterally until they mate with the lower edges.

A rubber padding made of crosslinked polyurethane of 6-8 mm thickness is glued onto the interior of the vamp, already previously reinforced by adhesive polyamide reinforcement.

A part of the material had been previously removed from the interior of the aforedescribed rubber padding by punching, to enable the circuit 1 to be later inserted. The removed material has the exact shape and dimensions of this element, which is described elsewhere. On both sides of the lateral edges of the upper inner wall of the vamp, previously reinforced with adhesive polyamide reinforcement, a female Velcro piece is sewn of height equal to the distance between the upper edge of the footwear lining and the upper edge of the outer neckpiece.

A female Velcro piece is sewn along the entire width of the inner upper edge of the lining.

This construction enables the entire lapel forming the shoe neck lining to be closed and reopened by a simple Velcro system, in order to position the circuit 1.

As an alternative, the circuit 1 could be positioned within the shoe tongue 6.

The shoe tongue lining is constructed not with the classical sewn joint with the outer leather and polyamide tongue insert which completely closes this latter, but instead together with the outer leather tongue insert forms a lapel which, by means of a female Velcro piece sewn inside its upper edge, couples to the outer polyamide insert of the tongue by means of a male Velcro piece sewn to the upper edge of this latter, whereas a female Velcro piece is sewn to the two lateral edges to couple to a male Velcro piece sewn directly onto the edges of the inner part of the tongue polyamide insert.

The top of the tongue lining is sewn to a vamp leather insert which is then folded outwards.

The entire edge of the tongue lining insert is sewn directly to the tongue leather insert such that the edge of the leather insert surmounts the lining by 3 mm-5 mm, both with the outer walls facing upwards; the two sewn elements together form the lapel. The lining is cut to a shape such that that part which represents its upper edge is folded over by 2 mm and sewn to form a sort of hood acting as a lead-in for correct closure of the lapel.

When hemming the neckpiece lining insert, a female Velcro piece for each of the two sides is applied and sewn to it laterally until mating with the upper edges of the bellows.

A rubber padding made of crosslinked polyurethane of 6-8 mm thickness is glued onto the outer polyamide tongue insert, already previously reinforced by felt.

A part of the material had been previously removed from the interior of the aforedescribed rubber padding by punching, to enable the circuit 1 to be later inserted. The removed material has the exact shape and dimensions of this element, which is described elsewhere. On both sides of the lateral edges of the inner wall of the polyamide tongue insert, a male Velcro piece is sewn of height equal to the distance between the upper edge of the tongue and the upper edge of the bellows.

On the outer upper area of the outer polyamide tongue insert a male Velcro piece is sewn having the same dimensions and adjacent positioning as the lapel leather insert.

This construction enables the entire hood shaped lapel forming the shoe tongue lining to be closed and reopened by a simple Velcro system, in order to position the circuit 1 within the cut-out shape in the 6-8 mm thick rubber padding.

The printed circuit support is made of flexible material with some rigid portions, so that it can be wrapped about the shoe. The component arrangement forms a rigid zone at the circuit ends, with dimensions approximately those of the batteries. In this manner four vertically elongated rigid zones are formed of about 20 mm width, separated by flexible vertical zones.

The flexible central zone has been left completely free of components for a width of 40 mm, with the exception of the switch 23. From the ergonomic viewpoint, this zone is in fact the most delicate, coinciding with the Achilles tendon.

All the components are positioned on the "side of the welds", hence facing the outer side of the shoe (towards the vamp). The thickness of the silicone enclosure is maintained at the minimum possible (2 mm) on both sides. The components of greater thickness are the batteries (4 mm), hence the total thickness of the piece is 8 mm, identical to current foam rubber padding.

The enclosure containing the electronic circuit is made completely of silicone rubber of Shore hardness 7; in this manner a degree of softness very similar to that of the current padding is maintained. The operation of the device of the invention is apparent from that described and illustrated, and is essentially the following.

The shoe of the present invention enables the constant location of the operator wearing the shoe to be known, and is able to transmit not only position information but also the information determined by the sensors and/or measuring instruments which may be connected, such as an altimeter, temperature and pressure indicators.

To perform the assigned functions, each shoe must therefore be configured to be able to be connected to a coordinator node or to the routers present geographically. By means of suitable safety codes, access to the network is prohibited to other potentially present but non-authorized ZigBee devices.

To form a network, according to the invention, a ZC configured ZigBee device is provided acting as a coordinator and/or local concentrator 31. The ZC function is assumed by a single node; ZED configured ZigBee devices (30) are also provided, typically positioned in the shoe.

The local ZC concentrator 31 makes the connection with several ZED elements 30 and enables remote communication with an operations centre 32, for example via GPRS, HSDPA, Satellite etc. devices.

To satisfy particular operation requirements, any ZED node 30 can also be configured as ZR, a ZigBee device acting as a router.

A ZR is used, for example, when a ZED (30) is unable to communicate with a ZC (31), but is able to communicate with another ZED (30) which itself is able to communicate with a ZC (31). In this case the intermediate ZC (31) behaves as a router and is hence configured as ZR.

If a magnetic switch is used as the switch 23 for switching on and off the devices contained in the shoe, it is provided with an external tab sewn into the rear central part of the shoe and rotatable about the sewing line. A small magnet is inserted into the tab. The tab must be provided with Velcro to be able to be fixed in two positions, position A (switched off) in which the tab is fixed such that the magnet is spaced from the rear central part, and position B (switched on), in which the tab is fixed such that the magnet lies at the rear central part. The rear central part is positioned at the switch 23, which is fixed substantially at the centre of the printed circuit.

With the tab in the "switched off" position, the device is in its minimum energy consumption mode. With the tab in the "switched on" position, the device is fully functional, being configured as ZED (30) but maintaining the locator switched off until a connection with the ZC (31) is established.

As an alternative to the magnetic switch for switching the device on and off, seeing the very low energy consumptions, the device could be set in the minimum consumption configuration and periodic "polling" (cyclic interrogation or information exchange) be effected on the ZC (31), for example every 10 minutes. During this operation the ZC device is also informed of the state of charge of the batteries of each ZED device (30).

Device activation and the request for information can also be performed remotely, the user being unable to switch off the device. When the device is initially switched on it has to be configured. This is done by assigning to each device the number (ID_Device), to be then used by the ZED (30) as reference for all communications. This code assigns a unique identification for each resource (person) which it identifies.

The code (ID_Network) is assigned, identifying the network on which it is to operate, and the security code (Security_Code) which is used in combination with the ID_Network. Any other device present within the range of action of the ZC (31) but which does not present the correct identification is not accepted within the network.

The locator unit 13 is accessed only after the device has been configured and is operative. Configuration takes place on command by the operations centre 32 which sends the command to the local concentrator 31 and in its turn to that ZED (30) identified by its number (ID_Device).

The management logic for the locator unit is always orientated towards minimum energy consumption and is also based on its actual operative state.

If the device is not configured, the locator is kept switched off to maximize battery life during the ZC (31) search and the initial configuration.

If it is configured and in the "Rest" state the locator is maintained switched off.

If it is configured and in the "Mission" state the locator is switched on and kept switched on until the first valid fix (data obtaining). Then to maximize battery life it enters into standby (also switching off the locator) and remains switched off for a predetermined time period. When this time expires it returns to full functionality, it connects to the ZC (31) and awaits the locator fix, then returns to standby. When the locator fix has taken place it feeds the relative data to the ZC (31).

If the locator fix does not take place within a predetermined time period, the locator is again maintained switched on until the first valid fix, exactly as when activating the "Mission" state.

Each ZC (31) present in the network then communicates with an operations centre 32 which displays the location of each person wearing the shoe, identified by the number (ID-_Device), on a map of the zone. The display includes signals originating from the sensors associated with it, which can be of any type. Based on this information, the operations centre 32 consequently handles the intervention. For example the location of a person is displayed together with the associated battery voltage, so that the centre 32 can modify (by reducing) the information transmission period (polling) or possibly informing the person concerned, by communicating therewith, to recharge or change the battery.

Being able to modify the information transmission period between a ZED (30) and the concentrator ZC (31) makes it possible, given that remote transmission is a function which consumes considerable energy, to control the battery consumption.

The information transmission period between the concentrator ZC (31) and the operations centre 32 can also be modified. Other information originating from the sensors can also be displayed, such as temperature, etc.

When the device is not in the "Mission" state the polling time is lengthened (even 10 minutes or more). In this case any interrogations, rather than modifications to the configuration, can take place only when the ZED device (30) is connected to the ZC (31). The commands for the ZED (30) are stored in a memory, the ZC (31) executing them automatically as soon as the ZED device (30) is connected. Each ZC (31) is itself controlled by the operations centre 32.

The description of certain aforegoing procedures has been limited because an expert of the art, based on the aforegoing description and on the known art, would be able to accomplish them.

The materials used and the dimensions can be chosen at will depending on requirements and on the state of the art. The system conceived in this manner is susceptible to numerous modifications and variants, all falling within the scope of the inventive concept; moreover all details can be replaced by technically equivalent elements.

The invention claimed is:

1. A system for managing geographically distributed resources, comprising:

a plurality of shoes associated with said resources;

a local concentrator (31) external to said shoes, and a remote operation centre (32);

each pair of said plurality of shoes comprising an electronic circuit (1) placed in said shoes;

said electronic circuit (1) comprising a control circuit (11) for said electronic circuit (1); a locator module (13) arranged to provide geographical coordinates to said control circuit (11); and a radio communication system (12);

said control circuit (11) arranged to provide a plurality of information items to said radio communication system (12);

said radio communication system (12) comprising a first receiver-transmitter, for a wireless short range of communication, to send said plurality of information items to said local concentrator (31); said local concentrator (31) is connected with said radio communication system (12);

said local concentrator (31) comprising a second receiver-transmitter, for a wireless long range of communication, arranged to send said plurality of information items to said operations centre (32);

said first receiver-transmitter sending said plurality of information items to said local concentrator (31) periodically;

said control circuit (11) comprising an input connected to at least one sensor (20);

said at least one sensor (20) comprises a meter for measuring the voltage of a battery (10) powering said electronic circuit (1);

said plurality of information items comprises said geographical coordinates which give the location of said control circuit (11) and the voltage of said battery (10);

said operations centre (32) displaying the location of each of said control circuit (11) and the voltage of said battery (10), so that said operations centre (32) reduce the transmission period of sending said plurality of information items from said first receiver-transmitter to said local concentrator (31) periodically, to control the battery consumption, and further modify the transmission period between the local concentrator (31) and the operations centre (32).

2. A system as claimed in claim 1, characterized by comprising a magnetic switch (23) for switching said electronic circuit (1) on and off.

3. A system as claimed in claim 2, characterized in that said magnetic switch (23) comprises an external tab sewn into the rear central part of the shoe, in which a magnet is inserted; said tab having two operative positions, one being a rest position and one being positioned at said magnetic switch (23).

4. A system as claimed in claim 1, characterized in that said sensor (20) comprises one or more sensors chosen from altimeter, temperature indicator, pressure indicator, meter for measuring the voltage of a battery (10) powering said electronic circuit (1).

5. A system as claimed in claim 1, characterized in that said first receiver-transmitter is of ZigBee type.

6. A system as claimed in claim 1, characterized in that said second receiver-transmitter is of GPRS type.

7. A system as claimed in claim 1, characterized in that said locator (13) is a GPS locator.

8. A system as claimed in claim 1, characterized in that said electronic circuit (1) is inserted into the upper inner rear part of said shoe.

9. A system as claimed in claim 1, characterized in that said electronic circuit (1) comprises a printed circuit with support of rigid-flexible material divided into four vertical rigid zones; the central zone comprising a magnetic switch.

10. A system as claimed in claim 9, characterized in that said printed circuit is positioned in an enclosure made of silicone rubber.

11. A system as claimed in claim 1, characterized in that said first receiver-transmitter receives information items from a plurality of said resources.

12. A system as claimed in claim 1, characterized in that said local concentrator (31) is wearable.

13. A method for managing geographically distributed resources, comprising the steps of providing said resources with a plurality of shoes, said method comprising the following steps:

inserting an electronic circuit (1) in one of each pair of said plurality of shoes;

providing said electronic circuit (1) with the geographical coordinates of said at least one shoe by means of a locator module (13), placed in each pair of said plurality of shoes;

providing said electronic circuit (1) with the value of the voltage of a battery (10) for powering said electronic circuit (1);

communicating said geographical coordinates and said voltage value to a local concentrator (31) periodically by means of a wireless short range communication;

communicating said geographical coordinates and said voltage value from said local concentrator (31) to an operations centre (32), by means of a wireless long range communication;

said operations centre (32) displaying the location of each of said electronic circuit (1) and the voltage of said battery (10), so that said operations centre (32) reduces the transmission period of sending said plurality of information items from a first receiver-transmitter to said local concentrator (31) periodically, to control the battery consumption, and further modify the transmission period between the local concentrator (31) and the operations centre (32).

* * * * *